Patented Feb. 26, 1952

2,586,852

UNITED STATES PATENT OFFICE 2,586,852

KAOLIN-PHOSPHORIC ACID POLYMERIZATION CATALYST

Jacque C. Morrell, Philadelphia, Pa.

No Drawing. Application November 6, 1947,
Serial No. 784,516

3 Claims. (Cl. 252—435)

This invention relates to the manufacture and use of catalysts particularly of the solid granular type which are suitable for organic reactions generally, polymerizing reactions specifically and more particularly for the polymerization of olefins to produce liquids from gaseous hydrocarbons and/or to increase the molecular weight of the compounds so treated.

In one specific embodiment the present invention relates to the use of mixtures of phosphoric acids and china clay or kaolin in admixture for the treatment of olefin hydrocarbons to polymerize the same—the mixture of china clay and phosphoric acids being heated or baked to bring about hardening by combined chemical reactions and removal of water. The acid may comprise 25 to 75% and more of the final weight of the catalyst.

The phosphoric acids employed are preferably the orthophosphoric and/or pyrophosphoric acids or mixtures of the same; which may also contain, if desired, some free $P_2O_5$, preferably to a thick syrupy consistency. The china clay which contains about 14% moisture mixes readily with the more concentrated acids up to 100% orthophosphoric or above. The heavy paste may be formed by extrusion or otherwise into suitable shapes and sizes.

The formed catalyst is then dried or baked at temperatures varying from 400 to 600° F. depending on the time it is so heated, concentrations of acids, etc. The lower range may be employed by the special modifications which I disclose herein to produce the catalyst directed to low temperature quick hardening.

The relatively inert material which may be used in my invention is china clay or kaolin (also sometimes referred to a kaolinite) which terms I shall employ alternatively in my invention.

China clay or kaolin is a unique material found in large quantities in nature (therefore cheap) and readily distinguishable from and having definite advantages over other materials heretofore proposed for this purpose. In this connection I am aware that the prior art discloses the use of phosphoric acid as a polymerizing agent e. g. E. P. 340,515 (1930) discloses the use of phosphoric acid on activated carbon or silica gel and that later patents have disclosed the use of phosphoric acid with materials of a siliceous character which include diatomaceous earth, kieselguhr and silica gel (artificially prepared porous silica). I am also aware that certain naturally occurring minerals such as fuller's earth, bentonite, montmorillonite and similar mineral adsorbent substances which have generally been used as refining agents in the petroleum industry have been mentioned. However, the use of china clay or kaolin with phosphoric acid has never been disclosed, and none of these materials of the prior art have the desirable properties of china clay or kaolin as will be apparent from the following characterization and properties. China clay or kaolin sometimes referred to as alba or white bole, terra bole, argilla or porcelain clay is a natural plastic material of remarkably high uniformity in characteristics and properties. It is composed of silicon, oxygen and hydrogen corresponding to the general formula: $Al_2O_3 2SiO_2 2H_2O$. Its origin is from the weathering of feldspars.

Kaolin is somethimes referred to as an aluminum-silicate but is probably all aluminosilicic acid.

It differs from the material of the prior art and can be distinguished therefrom in the following important respects. Infusorial earth, kieselguhr and silica gel are siliceous materials i. e. generally composed of silica and oxygen ($SiO_2$) and are, therefore, entirely different in composition and properties e. g. they lack plasticity and the property of hardening. Fuller's earth is not a true clay i. e. it lacks plasticity entirely and is readily fusible unlike china clay. Montmorillonite also has very little plasticity. It is composed largely of hydrogels of silica and is decomposed by boiling acids e. g. HCl. Bentonite, while highly colloidal, also lacks plasticity. Both montmorillonite and bentonite have a much higher silica to alumina ratio and water content than kaolin. They are both amorphous whereas kaolin shows a crystalline X-ray structure.

The materials of the prior art are generally of a porous and adsorbent nature whereas kaolin does not possess these properties and, therefore, cannot be classified as an adsorbent.

The plasticity of kaolin and its hardening characteristics are attributable to the interlocking of the minute crystals as well as chemical changes as indicated by low temperature transition points, and the loss of water on heating.

Having characterized and differentiated china clay or kaolin from the materials of the prior art, I shall now proceed to show how it is used and modified compositions may be made and used in connection with the present invention.

Concentrations of orthophosphoric acid from approximately 75% to 100%, or pyrophosphoric acid or mixtures thereof together or with $P_2O_5$, metaphosphoric, tetraphosphoric and in general a phosphoric acid in which phosphorus has a valence of 5 are employed. These are mixed with china clay (kaolin) perferably adding sufficient phosphoric acid to the china clay to obtain the maximum concentration and amount thereof while permitting further treatment of the mixture such as forming (by extrusion, etc.), cutting and heating or baking to dry the same. The relative amounts of kaolin and phosphoric acid may vary roughly between 25% to 75% of each, employing the higher proportions with pyrophosphoric acid and mixtures of ortho and $P_2O_5$.

The mixture of phosphoric acid and china clay constitutes a paste of varying consistency depending on the temperature of mixing, relative proportions of the kaolin and phosphoric acid and the kind and concentration of the latter. Also the application of a relatively small amount of heat rapidly thickens and congeals the mixture if necessary. The mixture is then formed into pellets, or it may be extruded and cut into suitable lengths of generally cylindrical or other shapes e. g. 1/8" to 1/4" diameter and about 1/4" length, or broken up into the desirable sizes after drying or baking. The latter process is carried out at 400° F. to 600° F. for one-half to 2 hours, which is referred to as a drying temperature range by prior art patents as contrasted with calcining temperatures of 900° F. at 16 hours for the prior art processes employing siliceous materials and as kieselguhr, infusorial earth and the like. The reason for the relatively mild treatment in the present invention is the natural tendency for the china clay to set at low temperatures owing to its plasticity and crystal structure when moistened and heated and the process as pointed out previously is essentially one of drying in addition to interlocking of the minute crystals as well as low temperature transition points and chemical changes generally, all of which are not possessed by the prior art materials.

When used for polymerizing normally gaseous olefins, the granules or particles of catalyst are generally placed in treating towers and the gases containing olefins are passed downwardly through the towers at temperatures of 400 to 500° F. and pressures of several hundred pounds e. g. 100 to 350 lbs. per square inch when employing stabilizer refluxes which contain e. g. 10 to 35% of propene and butenes. With gas mixtures containing normal and isobutene to obtain mixed polymerization the temperature may be lower e. g. 250 to 350° F. with pressure of 500 to 800 lbs. per square inch: Other reactions may be similarly carried out.

It may also be desirable to introduce some steam during the reaction to maintain the normal vapor pressure of the catalyst; or the gas may be saturated with water vapor.

To remove carbonaceous or hydrocarbonaceous materials which form and deposit during the treatment the catalysts are reactivated by superheated steam and/or air or oxygen at temperatures varying from 500° F. to 1000° F. dependent on the concentrations of oxygen. The steam concentration may be increased toward the end of the burning off period and then both steam and temperature are decreased toward the very end. These variations in steam concentration and temperature are directed towards maintaining the proper moisture content or vapor pressure and structure of the catalyst.

With regard to the structure and hardness of the catalyst which are important in the use and life of the catalyst as well as the rate and temperature level of drying, I have made several important improvements.

For example, I have found that I can increase the porosity of the catalyst very much by adding from 1% to 10% based on the kaolin by weight of calcium or magnesium oxides or mixtures of the same or the corresponding carbonates to the kaolin before mixing in the acid. Preferably the amounts of the materials added should be less than 5% based on the kaolin as they consume acid and in large amounts reduce the hardness and weaken the structure especially calcium oxide. The final products made from a mixture containing calcium oxide are softer and also tends to take up moisture more readily than mixtures containing magnesium oxide but on the other hand are more porous. A mixture of the two oxides (which ordinarily is found in commercial lime) varying the proportions gives good results. I have discovered also that zinc oxide has a beneficial effect on the hardness of the catalyst product and ease of drying when added to the kaolin to the extent of 1% to 5% and the hardness and ease of setting will be increased to an even greater extent if zinc chloride is also added to the mixture. The preferred manner of adding the zinc oxide and zinc chloride is as follows. The zinc oxide is first mixed with a small quantity of the kaolin and a concentrated or syrupy solution of zinc chloride is added. The remaining kaolin admixed with the phosphoric acid is then combined with the zinc oxide, zinc chloride, kaolin mixture. The catalyst resulting from this mixture is hard and dense and can be made more porous by incorporating calcium and/or magnesium oxides to the mixture.

Other additives to the kaolin to improve the properties of the resulting product from the viewpoints of quick setting, hardness, structure, etc. are aluminum phosphate (especially if the mixture contains zinc oxide), aluminum or sodium fluorides, copper or zinc silicates and others.

From the viewpoints of economy and control of porosity, hardness and accelerating setting, I prefer various proportions of calcium and magnesium oxides taking advantage of the properties imparted by each in determining the relative proportions of each e. g. as pointed out previously calcium oxide produces a more porous product but is softer and takes up water quite readily but these features are corrected by the magnesium oxide. The corresponding carbonates are useful in increasing porosity because of the evolution of carbon-dioxide.

Other chemical reactions such as alkylation, condensation, isomerization, esterification, etc. may be carried out also with these catalysts or modifications thereof.

The following examples for the preparations and use of these catalysts in polymerizing olefinic gases are illustrative, but are not to be construed as imposing undue limitations upon the broad scope of the invention.

*Example 1*

65% by weight of pyrophosphoric acid and 35% by weight of kaolin were mixed at a temperature of about 325° F. The mixture was extruded through a die of about 1/8" diameter and cut into lengths of about 1/4". The pieces were then dried at a temperature of approximately 575° F. for about two hours.

*Example 2*

70% by weight of a mixture containing pyro and orthophosphoric acids and 30% of kaolin containing 5% (by weight of the kaolin) of an equal mixture of magnesium and calcium oxides were admixed and formed after a short period of warming by extrusion, etc. as in Example 1. The mixture was dried at a temperature varying from 575° F. to 600° F.

Example 3

65% by weight of a mixture of pyrophosphoric and orthophosphoric acids and 35% of kaolin containing 5% of a mixture of zinc and magnesium oxides were formed and dried as in Example 1.

Example 4

60% by weight of orthophosphoric acid was mixed with 30% by weight of kaolin and to this mixture was added 10% of a mixture of kaolin containing about 10% each of zinc oxide and zinc chloride (in aqueous solution) based on the latter mixture. The total kaolin, zinc oxide and zinc chloride component was 40%. The mixture was formed and dried at approximately 525° F. to 550° F.

Example 5

65% of ortho and pyrophosphoric acids were mixed with 25% of kaolin containing 5% by weight of the kaolin of mixed oxides of calcium and magnesium. To this mixture was added 10% of kaolin containing zinc oxide and zinc chloride prepared as in Example 4 but using about one-half the quantity. The mixture was formed and dried at about 575° F.

Each modifying substance has its own effect and, therefore, they are not to be considered as equivalents. However, with all of the catalysts described one may obtain good yields of liquid products when polymerizing gases containing olefins such as propenes and butenes. The conditions of treatment may be between 400° F. to 500° F. more or less employing pressures of several hundred pounds per square inch with stabilizer gases or refluxes containing 10% to 40% of propenes and butenes. With normal and isobutene mixtures, lower temperatures may be employed but the pressures should be somewhat higher as previously noted.

The efficiency of the process varies not only with the specific catalysts and operating conditions but also with the concentrations and types of olefins. The catalyst efficiency may gradually decrease e. g. from about 60% to 80% to less than 10% dependent on the length of use of the catalyst, the conditions of treatment, etc. The catalyst is finally reactivated in the ordinary manner by burning off the carbonaceous and hydrocarbonaceous material with oxygen or air and/or steam treatment.

The description and examples are illustrative and are not to be construed as restrictive on the broad scope of the invention.

By minor amounts as used in the claims I mean less than 10%.

I claim as my invention:

1. A catalyst suitable for polymerizing olefin hydrocarbons consisting essentially of a mixture of a phosphoric acid and kaolin baked at an elevated temperature prior to the polymerizing process, the said kaolin comprising not less than 25% of the baked mixture.

2. A catalyst suitable for polymerizing olefin hydrocarbons consisting essentially of a mixture of a phosphoric acid selected from the group comprising orthophosphoric and pyrophosphoric acids and kaolin baked at an elevated temperature prior to the polymerizing process, the said kaolin comprising not less than 25% of the baked mixture.

3. A composition of matter suitable for use as a catalyst which consists essentially of a baked mixture of a phosphoric acid selected from the group comprising orthophosphoric and pyrophosphoric acids and kaolin, the said kaolin comprising not substantially less than 25% of the baked mixture.

JACQUE C. MORRELL.

REFERENCES CITED

The following references are of record in the file of this patent:

UNITED STATES PATENTS

| Number | Name | Date |
|---|---|---|
| 1,993,512 | Ipatieff | Mar. 5, 1935 |
| 2,020,649 | Ipatieff | Nov. 12, 1935 |
| 2,063,933 | Ipatieff | Dec. 15, 1936 |
| 2,126,282 | Rose | Aug. 9, 1938 |
| 2,324,079 | Greger | July 13, 1943 |
| 2,400,621 | Alther | May 21, 1946 |
| 2,415,069 | Arvin et al. | Feb. 4, 1947 |